(12) United States Patent
Nortman (10) Patent No.: US 7,616,977 B1
(45) Date of Patent: Nov. 10, 2009

(54) METHOD AND APPARATUS FOR MOTORIZED CONTROL OF AN AUTOMOBILE RADIO COVER

(76) Inventor: Scott David Nortman, 141 7th Ave., San Francisco, CA (US) 94118

( * ) Notice: Subject to any disclaimer, the term of this patent is extended or adjusted under 35 U.S.C. 154(b) by 596 days.

(21) Appl. No.: 11/341,108

(22) Filed: Jan. 28, 2006

Related U.S. Application Data (60) Provisional application No. 60/647,463, filed on Jan. 28, 2005.

(51) Int. Cl.
*H04M 1/00* (2006.01)

(52) U.S. Cl. ............ 455/575.8; 340/426.1; 340/426.11; 174/66; 174/67; 307/9.1; 307/10.8

(58) Field of Classification Search ............. 455/575.8; 340/426.1, 426.11; 174/66, 67
See application file for complete search history.

(56) References Cited

U.S. PATENT DOCUMENTS

| | | | | |
|---|---|---|---|---|
| RE14,916 E | * | 7/1920 | Pitney ........................ 101/77 |
| 1,479,401 A | * | 1/1924 | Smith ........................ 493/110 |
| 2,588,788 A | * | 3/1952 | Zell ........................... 169/26 |
| 2,990,932 A | * | 7/1961 | Muller .................... 198/463.4 |
| 3,103,630 A | * | 9/1963 | Pitts et al. .................. 455/346 |
| 3,242,621 A | * | 3/1966 | Willson ........................ 52/86 |
| 3,314,084 A | * | 4/1967 | Balikjian ...................... 4/249 |
| 3,735,412 A | * | 5/1973 | Kampmeyer ........... 340/825.72 |
| 4,209,186 A | * | 6/1980 | Close .......................... 280/803 |
| 4,388,196 A | * | 6/1983 | Lucia ......................... 210/742 |
| 4,584,717 A | * | 4/1986 | Strickland .................. 455/345 |
| 4,897,632 A | * | 1/1990 | Hock et al. ................. 340/457 |
| 5,068,765 A | * | 11/1991 | Nimpoeno .................. 361/814 |
| 5,142,701 A | * | 8/1992 | Buckley ..................... 455/345 |
| 5,255,965 A | * | 10/1993 | Chen et al. .................. 312/7.1 |
| 5,307,048 A | * | 4/1994 | Sonders .................. 340/426.12 |
| 5,424,712 A | * | 6/1995 | Rosenberger .......... 340/426.26 |
| 5,460,100 A | * | 10/1995 | Gowda et al. ............... 105/341 |
| 5,491,614 A | * | 2/1996 | Fowler et al. ............... 361/784 |
| 5,526,235 A | * | 6/1996 | Beason et al. ............... 361/799 |
| 5,593,191 A | * | 1/1997 | DeMarco .................... 292/144 |
| 5,860,593 A | * | 1/1999 | Heinle et al. .............. 236/91 C |
| 5,871,481 A | * | 2/1999 | Kannenberg et al. .......... 606/34 |
| D409,927 S | * | 5/1999 | Wiegers et al. .............. D10/65 |
| 5,924,782 A | * | 7/1999 | Park .......................... 312/328 |
| 6,021,691 A | * | 2/2000 | Wilkerson, Jr. .............. 74/547 |
| 6,057,787 A | * | 5/2000 | Kell et al. ................... 340/984 |
| D426,481 S | * | 6/2000 | Laverick .................... D10/103 |
| 6,123,372 A | * | 9/2000 | Rogers et al. ............... 292/216 |
| 6,131,042 A | * | 10/2000 | Lee et al. ................. 455/556.1 |
| 6,134,836 A | * | 10/2000 | Kawanobe et al. ............ 49/360 |
| 6,138,068 A | * | 10/2000 | Liu ............................. 701/49 |

(Continued)

OTHER PUBLICATIONS

Bridge Electronic Design, LLC "tCover Installation Manual and User's Guide", 2005, www.tCover.net, Bridge Electronic Design, LLC, San Francisco, CA, USA, 39 pages.*

*Primary Examiner*—Duc Nguyen
*Assistant Examiner*—Hai V Nguyen
(74) *Attorney, Agent, or Firm*—Marc Boillot (57) ABSTRACT

A method and apparatus which automates the radio cover assembly of the Scion tC automobile. The apparatus mounts to the radio cover frame and contains a motor, a linkage system, and a microcontroller. The radio cover can automatically move from an opened to closed position and visa-versa.

11 Claims, 11 Drawing Sheets

U.S. PATENT DOCUMENTS

| | | | |
|---|---|---|---|
| 6,138,749 A * | 10/2000 | Kawai et al. | 165/204 |
| 6,150,732 A * | 11/2000 | Ronitz et al. | 307/10.1 |
| 6,179,036 B1 * | 1/2001 | Harvey | 160/188 |
| 6,231,113 B1 * | 5/2001 | Armbruster et al. | 296/155 |
| 6,246,891 B1 * | 6/2001 | Isberg et al. | 455/574 |
| 6,290,269 B1 * | 9/2001 | Bodley-Scott et al. | 292/216 |
| 6,301,472 B1 * | 10/2001 | Nakasu et al. | 455/405 |
| 6,520,549 B1 * | 2/2003 | Kalsi | 292/216 |
| 6,525,499 B2 * | 2/2003 | Naganuma | 318/445 |
| 6,595,608 B1 * | 7/2003 | Minelli et al. | 312/296 |
| 6,697,719 B2 * | 2/2004 | Stouffer et al. | 701/36 |
| 6,701,671 B1 * | 3/2004 | Fukumoto et al. | 49/280 |
| 6,719,333 B2 * | 4/2004 | Rice et al. | 292/216 |
| 6,729,071 B1 * | 5/2004 | Kawanobe et al. | 49/360 |
| 6,734,648 B2 * | 5/2004 | Fukumura et al. | 318/468 |
| 6,781,516 B2 * | 8/2004 | Reynard et al. | 340/686.1 |
| 6,822,558 B1 * | 11/2004 | Haderer | 340/426.1 |
| 6,854,328 B2 * | 2/2005 | Badiali | 73/431 |
| 6,870,340 B2 * | 3/2005 | Fukumura et al. | 318/468 |
| 6,967,451 B2 * | 11/2005 | Miyauchi | 318/443 |
| 6,975,226 B2 * | 12/2005 | Reynard et al. | 340/540 |
| 7,017,659 B2 * | 3/2006 | Tsunoda | 165/202 |
| 7,042,343 B2 * | 5/2006 | Konno et al. | 340/427 |
| 7,042,363 B2 * | 5/2006 | Katrak et al. | 340/644 |
| 7,073,291 B2 * | 7/2006 | Kawanobe et al. | 49/26 |
| 7,127,332 B2 * | 10/2006 | Strohmeier et al. | 701/1 |
| 7,243,461 B2 * | 7/2007 | Rogers et al. | 49/360 |
| D552,540 S * | 10/2007 | Miyauchi et al. | D13/112 |
| 7,325,361 B2 * | 2/2008 | Rogers et al. | 49/360 |
| 7,375,279 B2 * | 5/2008 | Chen | 174/66 |
| 7,389,127 B2 * | 6/2008 | Nomiyama et al. | 455/562.1 |
| 7,432,810 B2 * | 10/2008 | Menache et al. | 340/572.1 |
| 7,537,169 B2 * | 5/2009 | Gonzalez et al. | 235/492 |
| 2002/0134955 A1 * | 9/2002 | Konwinski | 251/68 |
| 2002/0140687 A1 * | 10/2002 | Takeda | 345/204 |
| 2002/0158475 A1 * | 10/2002 | Rice et al. | 292/216 |
| 2002/0195878 A1 * | 12/2002 | Willats et al. | 307/10.2 |
| 2003/0038733 A1 * | 2/2003 | Willats et al. | 340/825.72 |
| 2003/0162538 A1 * | 8/2003 | Yoo et al. | 455/423 |
| 2003/0222758 A1 * | 12/2003 | Willats et al. | 340/5.72 |
| 2004/0098598 A1 * | 5/2004 | Wolfram | 713/186 |
| 2004/0147295 A1 * | 7/2004 | Domes | 455/575.1 |
| 2004/0195916 A1 * | 10/2004 | Katrak et al. | 307/4 |
| 2005/0017852 A1 * | 1/2005 | Stouffer et al. | 340/426.1 |
| 2005/0018392 A1 * | 1/2005 | Strohmeier et al. | 361/683 |
| 2005/0128068 A1 * | 6/2005 | Winick et al. | 340/517 |
| 2005/0153661 A1 * | 7/2005 | Beck | 455/73 |
| 2005/0212655 A1 * | 9/2005 | Underdahl | 340/5.64 |
| 2005/0261816 A1 * | 11/2005 | DiCroce et al. | 701/36 |
| 2006/0207730 A1 * | 9/2006 | Berman et al. | 160/310 |
| 2007/0128899 A1 * | 6/2007 | Mayer | 439/152 |
| 2007/0188168 A1 * | 8/2007 | Stanley et al. | 324/228 |
| 2007/0205612 A1 * | 9/2007 | Graute | 292/216 |
| 2007/0233342 A1 * | 10/2007 | DiCroce et al. | 701/36 |
| 2008/0027572 A1 * | 1/2008 | Romoser | 700/94 |
| 2008/0155261 A1 * | 6/2008 | Sato et al. | 713/169 |
| 2008/0177447 A1 * | 7/2008 | Hsiang | 701/45 |
| 2008/0252476 A1 * | 10/2008 | Cosgrove | 340/691.7 |
| 2008/0315596 A1 * | 12/2008 | Terry et al. | 292/327 |

\* cited by examiner

Legend

051 - radio cover assembly
052 - moveable radio cover
053 - radio cover frame
054 - mounting holes
055 - plastic linkage

FIG. 6

Legend

| | |
|---|---|
| 600 - Apparatus | 067-Control Signal Connector |
| 061-Circuit Board Assembly | 068-Override Switch Connector |
| 062-Servo Motor | 069-Double "Z-Bend" Linkage Rod |
| 063-Servo Horn Linkage | 0610-90 Degree Bellcrank |
| 064-assembly mounting hole | 0611-Threaded Linkage Rod |
| 065-Servo Mounting Holes | 0612-Ballend |
| 066-microcontroller | |

FIG. 7

Legend

| | |
|---|---|
| 700 - Apparatus Assembly | 077 - Threaded Linkage Rod |
| 071 - Radio Cover Assembly | 078 - Ballend |
| 072 - Apparatus | 079 - Metal Ball |
| 073 - Mounting screw | 0710 - Radio Cover |
| 074 - Double "Z-Bend" Link Rod | 0711 - Radio Cover Plastic Linkage |
| 075 - 90 Degree Bell Crank | 0712 - Servo Horn Linkage |
| 076 - Bell Crank mounting screw | |

Legend

| |
|---|
| 081 - Apparatus |
| 082 - Radio Cover |
| 083 - Radio Cover Plastic Linkage |
| 084 - Radio Cover Assembly gear teeth |
| 085 - Radio Cover Assembly gear head |

Legend

| |
|---|
| 091 - Dashboard Center Console |
| 092 - Radio Cover Assembly |
| 093 - Apparatus |
| 094 - Override switch |

Control Component of the Preferred Embodiment of the Present Invention

METHOD AND APPARATUS FOR MOTORIZED CONTROL OF AN AUTOMOBILE RADIO COVER

CROSS REFERENCE TO RELATED APPLICATION

This application claims the priority benefit of U.S. Provisional Patent Application No. 60/647,463 entitled "Method and Apparatus for Motorized Control of the Scion tC Automobile Radio Cover" filed Jan. 28, 2005, the entire contents of which are hereby incorporated by reference.

FIELD

The present invention relates generally to automotive accessories. More particularly, the invention relates to a radio cover assembly in the Scion® tC automobile, and more specifically to automating an opening and closing of the radio cover.

BACKGROUND

Figure 1:
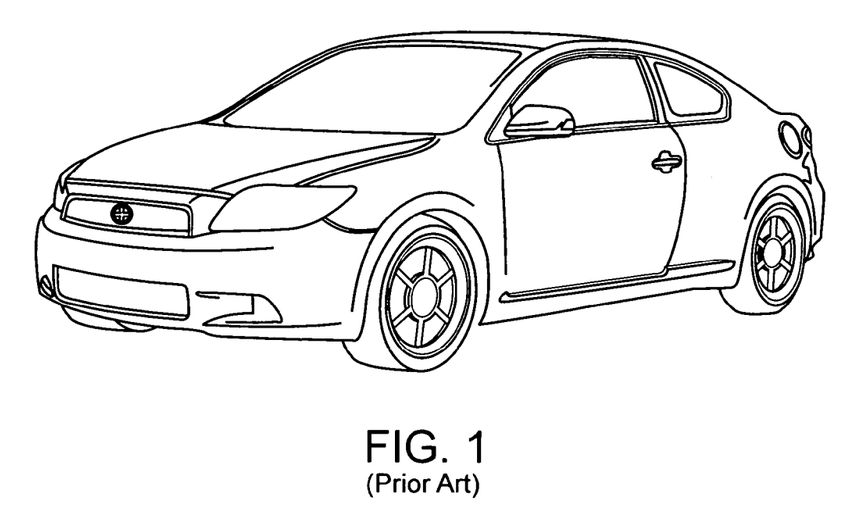
FIG. 1 is a prior art drawing of the Toyota Motor Company's Scion® tC automobile.

The Scion® tC is a new automobile model released by Toyota® Motor Sales, Inc. and branded under their Scion® marquee. FIG. 1 shows an illustration of the Scion® tC automobile.

Figure 2:
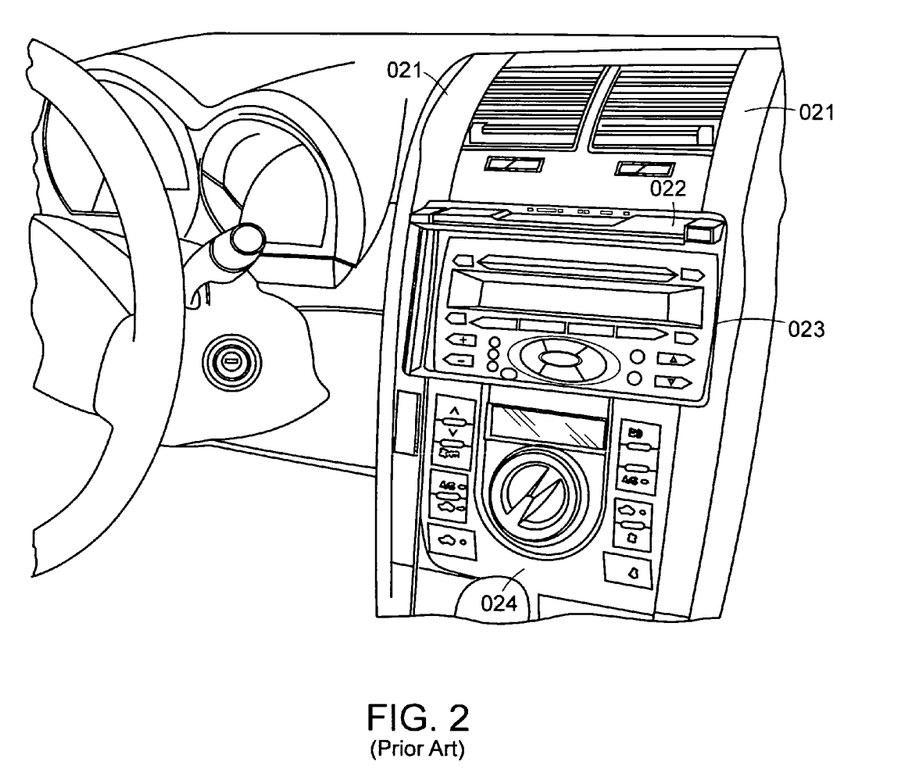
FIG. 2 is a prior art drawing showing the interior dashboard of the Scion® tC automobile.

FIG. 2 is a prior art drawing showing the interior dashboard of the Scion® tC automobile. The dashboard includes a Dashboard center console 021 that forms the main center structure of the dashboard and houses a Radio Head Unit 023, a Manually Operated Radio Cover 022, and additional controls 024. The Manually Operated Radio Cover 022 is shown in the Opened Position and attaches to the center console 021 and covers the radio head unit 023. The radio head unit 023 can be concealed by the manually operated radio cover 022. It is located in the center console 021. Additional Controls 024 can control the operation of the air conditioning, defroster, hazard lights, and other miscellaneous functions. They are located in the center console 021.

Figure 3:
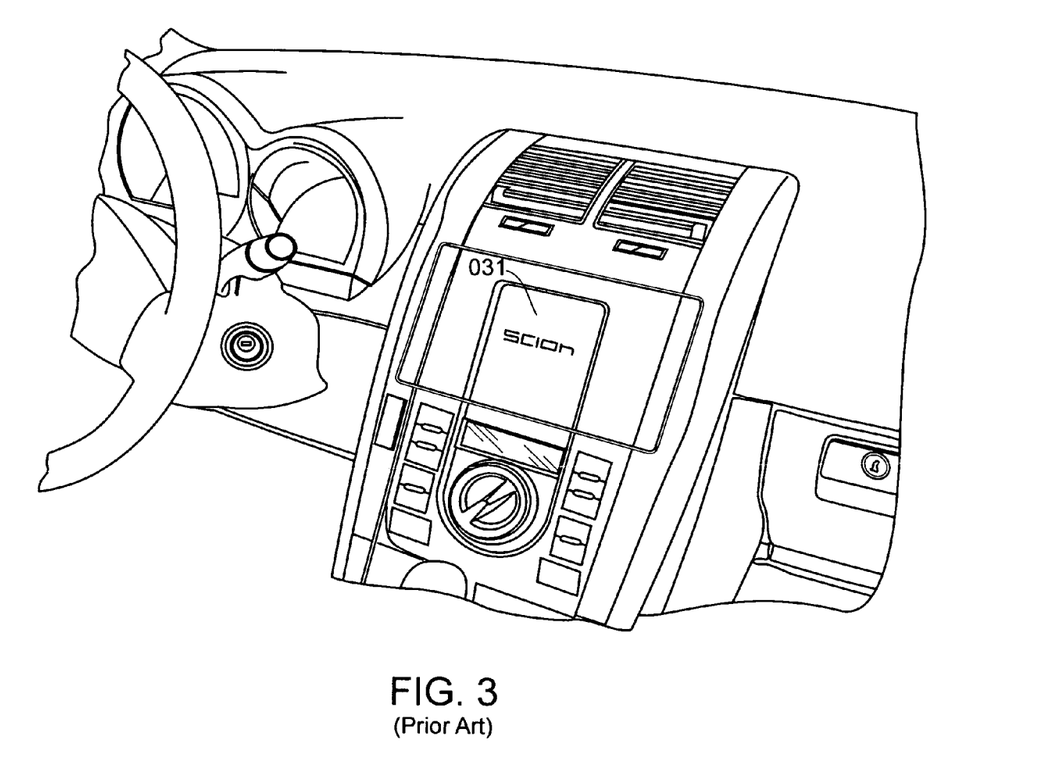
FIG. 3 is a prior art drawing of the manually operated radio cover in a closed position.

FIG. 3 is a prior art drawing of the manually operated radio cover 031 (referenced as 022 in a prior paragraph) in a closed position. The center console of the Scion® tC dashboard contains the movable radio cover, capable of being in an opened and closed position. When the radio cover is in the closed position, the radio is concealed, prevented anyone from viewing or operating the radio. When the radio cover is opened, the radio may be viewed and operated as normal. This stock radio cover may be manually opened and closed by means of a spring-loaded latching mechanism.

Figure 4:
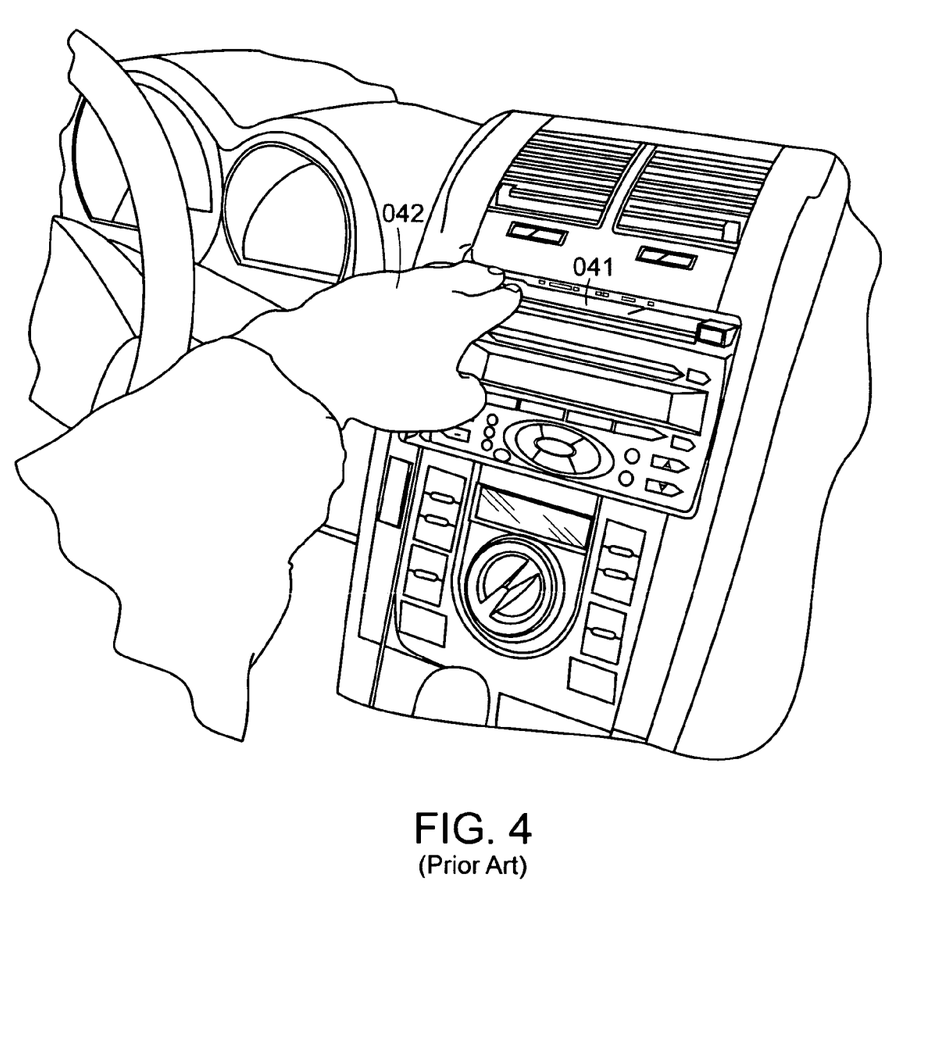
FIG. 4 is a prior art drawing of the manually operated radio cover moving from the opened to closed position by means of the user's hand.
Figure 5:
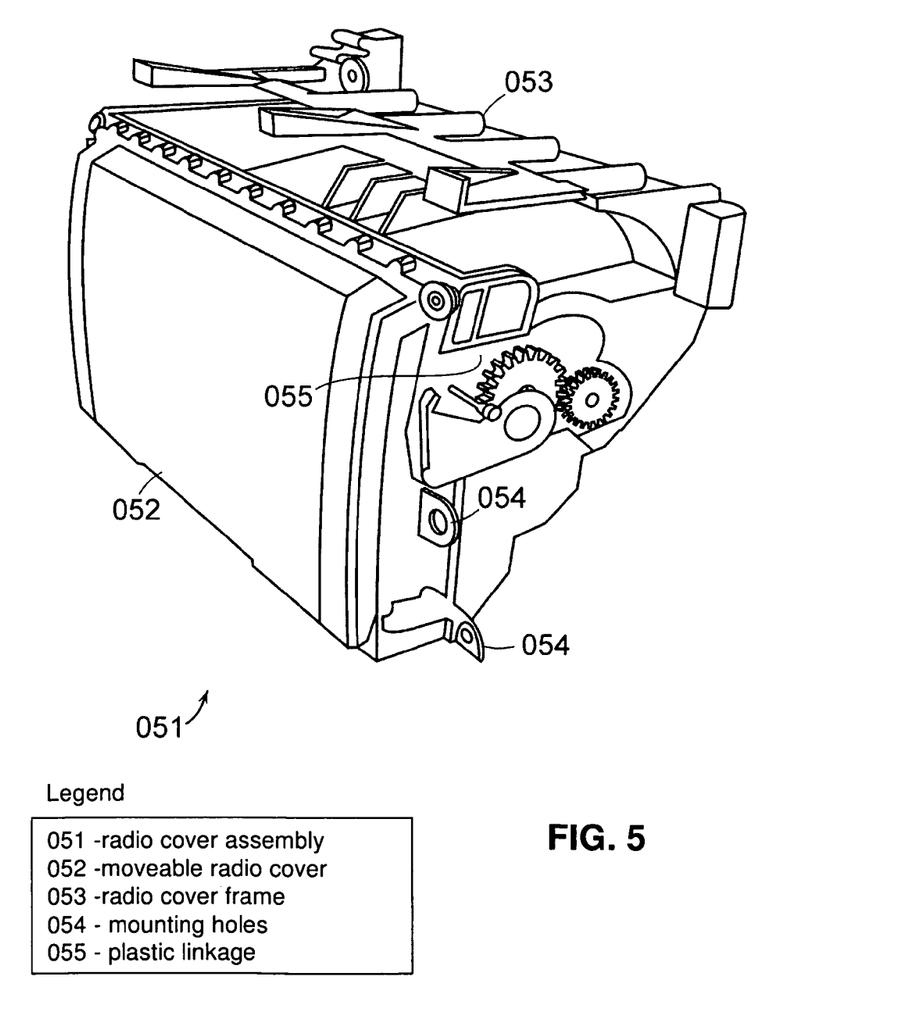
FIG. 5 is a prior art image of the radio cover assembly detached from the dashboard center console with the cover in a closed position.

FIG. 4 is a prior art drawing of the manually operated radio cover 041 (referenced as 022 in prior paragraph) moving from the opened to closed position by means of a user's hand 042. When in the closed position, the user must push on the cover to disengage a locking mechanism, thereby allowing an internal spring to force the cover open. When the cover is in the opened position, the user must manually push the cover to the closed position to engage the locking mechanism such that the cover will remain closed after the user stops pushing. FIG. 5 is a prior art image of the radio cover assembly 051 detached from the dashboard center console with the cover 052 in a closed position. The radio cover assembly 051 can be detached from the center console 021. The moveable radio cover 052 can be manually operated and may be moved to an opened and closed position. The radio cover frame 053 forms the main structure of the radio cover assembly 051. The mounting holes 054 provide a point of attachment for the cover assembly frame 053 to the center dash console 021. The radio cover plastic linkage 055 connects the radio cover 052 to the radio frame 053.

The radio cover serves many practical purposes. First, it is aesthetically appealing. When in the closed position, the dashboard appears uniform. Second, it prevents unauthorized viewing of the radio head unit 023. Third, it protects the radio from damage in the event that the automobile is involved in an accident. While there are many benefits, the main disadvantage of the radio concerns the fact that it must be opened and closed manually. This manual operation requires the user to exert extra effort when opening or closing the radio cover. The user may not want to constantly open and/or close the radio cover every time they enter and/or exit the vehicle. Furthermore, the user may forget to close the radio cover when exiting the vehicle, allowing unauthorized viewing of the radio head unit 023. This is a security risk.

BRIEF DESCRIPTION OF THE DRAWINGS

The present invention is illustrated by way of example, and not by way of limitation, in the figures of the accompanying drawings and in which.

DETAILED DESCRIPTION

The present invention is best understood by reference to the detailed figures and description set forth herein.

In view of the aforementioned, there exists a need to automate the opening and closing of the Scion® tC radio cover. Furthermore, the user should not need to exert any effort to position the radio cover and the radio cover will move to the open position when the ignition key is turned to the "on" position, and the radio cover will move to the "closed" position when the ignition key is in the "off" position. It would be desirable if the automated radio cover would open and close automatically, without any user intervention, in response to the position of the ignition key. Additionally, it would also be desirable to allow for a manually operated override switch that would cause the automated cover to ignore the position of the ignition switch and move to the opened or closed position based on the position of the switch alone. Embodiments of the invention are discussed below with reference to the Figures. However, those skilled in the art will readily appreciate that the detailed description given herein with respect to these figures is for explanatory purposes as the invention extends beyond these limited embodiments.

Figure 6:
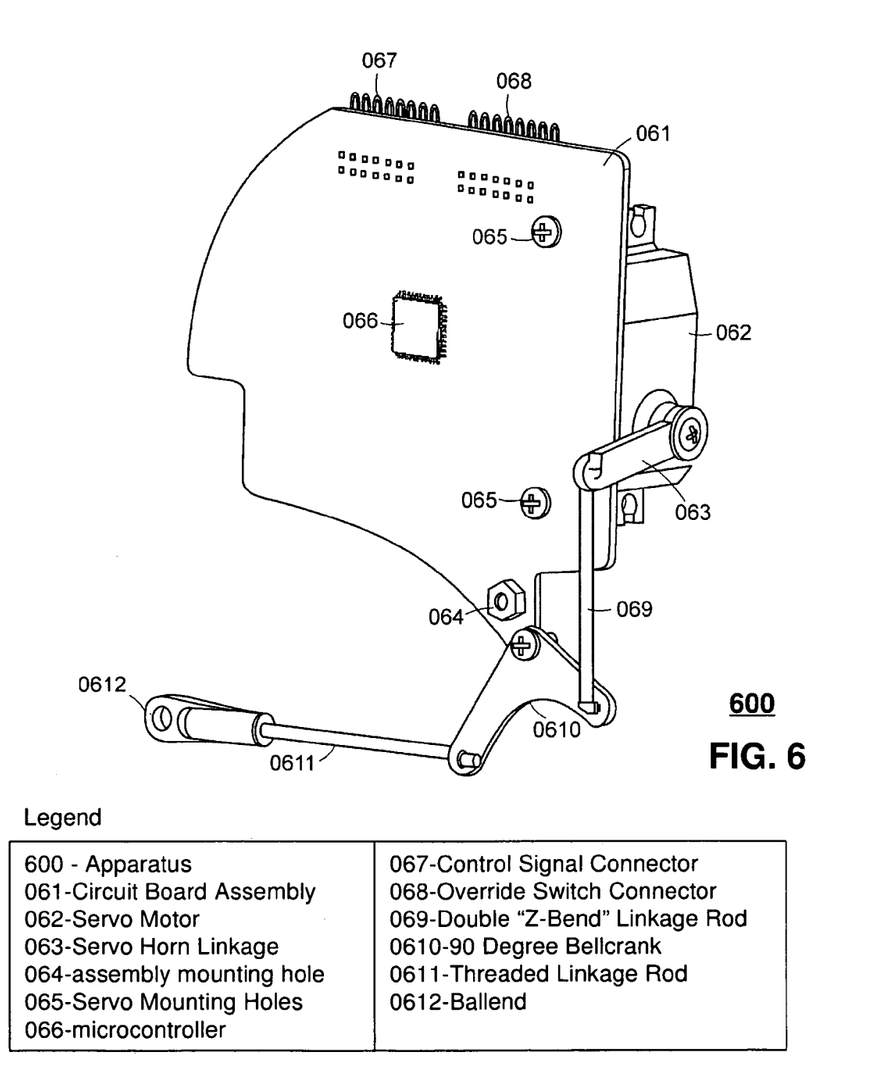
FIG. 6 is an illustration of the preferred embodiment of the invention.

FIG. 6 is an illustration of the apparatus 600 in a preferred embodiment for automated control of a radio cover assembly present in the Scion® tC automobile. The apparatus 600 comprises (a) a Printed Circuit Board assembly 061 which is mounted to a radio frame of the radio cover assembly (see 051 FIG. 5) to provide mechanical support and a common point of attachment; (b) a servo motor 062 mounted to the Printed Circuit Board assembly 061 for providing actuation motion; (c) a linkage system (comprising, but not limited, to elements 069, 0610, 0611 and 0612 as explained ahead) to couple the actuation motion from said servo motor to the radio cover; and (d) a microcontroller 066 to control the servo motor.

The apparatus 600 contains the servo motor, the linkage system, and the microcontroller. The microcontroller operates the servo motor to move the radio cover 052 (see FIG. 5) from an opened to a closed position and visa-versa in an automated manner by way of the linkage system (comprising, but not limited, to elements 069, 0610, 0611 and 0612 as explained ahead). In one arrangement, the microcontroller 066 can open and close the radio cover 052 upon detecting an ignition accessory signal, generated by an ignition switch turned to an "on" or "off" position. Briefly, the ignition accessory signal is provided by the ignition switch (e.g., where the car key is inserted) of the Scion® tC auto mobile as shown in FIG. 3. The microcontroller 066 can monitor this ignition accessory signal to determine if the ignition key (i.e., car key) is in an "off" position (e.g., turn off car engine) or an "on" position (e.g., turn on car engine).

The apparatus 600 can detect the ignition accessory signal to determine when the ignition switch is turned on or off for commanding the Servo Motor to open the radio cover when the ignition key is turned to an "on" position, and commanding the Servo Motor to close the radio cover when the ignition key is turned to an "off" position. The apparatus 600 includes Assembly Mounting Hole with Nut (064) that provides and attachment point for the PCB 061 to the assembly frame 053. Servo Mounting Holes 065 (with Screws) provide a point of attachment between the servo motor 062 and the PCB 061. The microcontroller 066 receives power and data from the control signal connector 067 and the override switch connector 068, and generates a control signal for the servo motor 062.

The Control Signal Connector 067 provides a point of connection between the power input signal 101 and the ignition accessory signal 102 to the microcontroller 066. As an example, the ignition accessory signal 102 can identify when a user has inserted and turned a key in the ignition switch. The Override Switch Connector 068 provides a point of connection between the override switch input signal 103 and the microcontroller 066. As an example, the Override Switch input signal determines whether the microcontroller 066 should command the servo motor to open or close the radio cover in response to the ignition accessory signal or ignore the ignition accessory signal and open or close the radio cover (052, see FIG. 5) based upon the position of the override switch signal alone.

Figure 7:
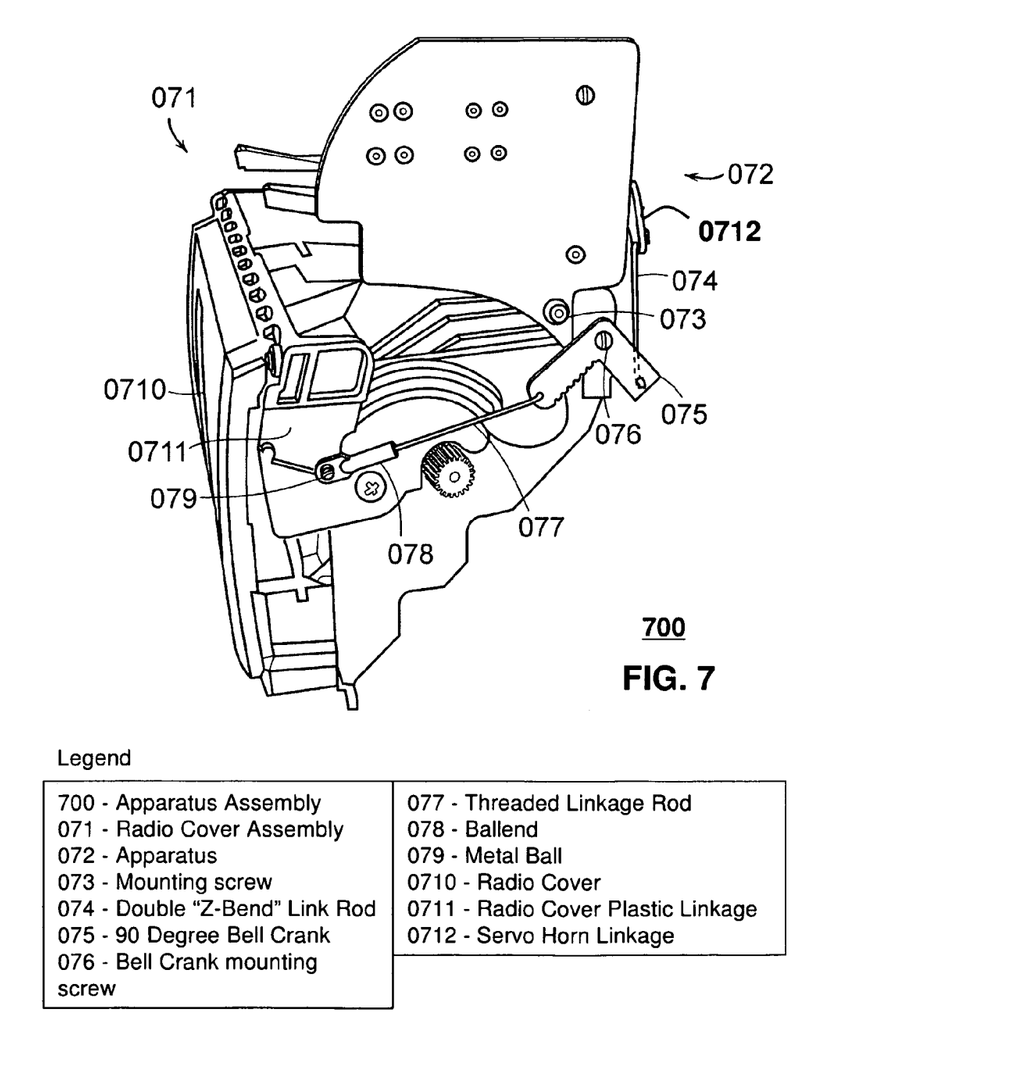
FIG. 7 is an image of the preferred embodiment of the invention installed onto the Scion® tC radio cover assembly, with the cover in a closed position.

The Double "Z-Bend" Linkage Rod 069 transfers movement from the servo horn 063 to the bellcrank 0610. The 90 Degree Bellcrank 0610 transfers motion from the double "z-bend" link rod 069 to the threaded link rod 0611. The threaded link rod 0611 transfers motion from the 90 degree bellcrank 0610 to the ballend 0612. The ballend 0612 is attached to the threaded link rod 0611 at one end and the metal ball 079 at the opposite end. The metal ball 079 is rigidly attached to the 0711 Radio Cover Plastic Linkage, which in turn is rigidly attached to the Radio Cover 0710.

As illustrated in FIG. 6. the automated control of the radio cover assembly (see 500 FIG. 5) present in the Scion® tC automobile can be performed by the apparatus 600. The apparatus 600 is mountable to the Radio Cover Assembly 051 (see FIG. 5) to provide mechanical support and a common point of attachment. The apparatus 600 comprises (a) a Servo Motor 0620 mountable to the Radio Cover Assembly 051 (see FIG. 5) for providing actuation motion of (b) a linkage system comprising components 069, 0610, and 0611 to couple the actuation motion from the servo horn linkage 630 of the servo motor 0620 to the radio cover (see 052 FIG. 5) and (c) a microcontroller 066 to control the servo motor 0620.

Components of the apparatus 600 of FIG. 6 are carried forward in the description of FIG. 7, although the numerals have been updated in accordance with the FIG. 7. The apparatus 600 of FIG. 6 correspond to the apparatus 072 of FIG. 7 and when mounted to the radio cover assembly 071 (i.e., radio cover assembly 500, FIG. 5) comprises apparatus assembly 700.

Referencing FIG. 7, in a typical embodiment of the present invention, the apparatus 072 is mounted to the radio frame assembly 071 via the mounting screw 073. The servo horn linkage 0712 (i.e., 063 of FIG. 6) connects to the double "z-bend" linkage 074. The other end of linkage 074 connects to the bellcrank 075. The bellcrank 075 is mounted to the radio frame such that it may pivot about a central point of attachment via the mounting screw 076. The bellcrank 075 has two possible connection points, one of which is occupied by the previously mentioned linkage 074. The other end of the bellcrank 075 is attached to the threaded linkage rod 077. The other end of the linkage rod 077 is mounted to the ballend 078. The ballend 078 is then attached to the metal ball 079. The metal ball 079 is mounted to the radio cover plastic linkage 0711. The plastic linkage 0711 is rigidly affixed to the movable radio cover 0710. Therefore, based on the aforementioned physical description of the linkage system, specifically 0712, 074, 075, 077, 078, 079, and 0711, the motion of the servo horn linkage 0712 will affect the position of the moveable radio cover 0710.

The movement of the servo motor 062 (See FIG. 6) and the servo horn linkage 0712, and the linkage system (074, 075, 077, 078, and 079), and hence the radio cover—0710, is controlled by the microcontroller 066. The microcontroller 066 is electrically connected to electrical connectors 067 and 068. The input signals input to the electrical connectors are generated by the internal signals present in the Scion® tC automobile. These signals include the override switch input signal 112 and the accessory input signal 113. The override switch and its signal 112 are an additional part of the present embodiment of the invention which is not included in the Scion® tC automobile as original factory equipment. The accessory input signal 113 is generated from the original factory equipment of the Scion® tC automobile. These two signals 112 and 113 are monitored by the microcontroller 066.

Figure 8:
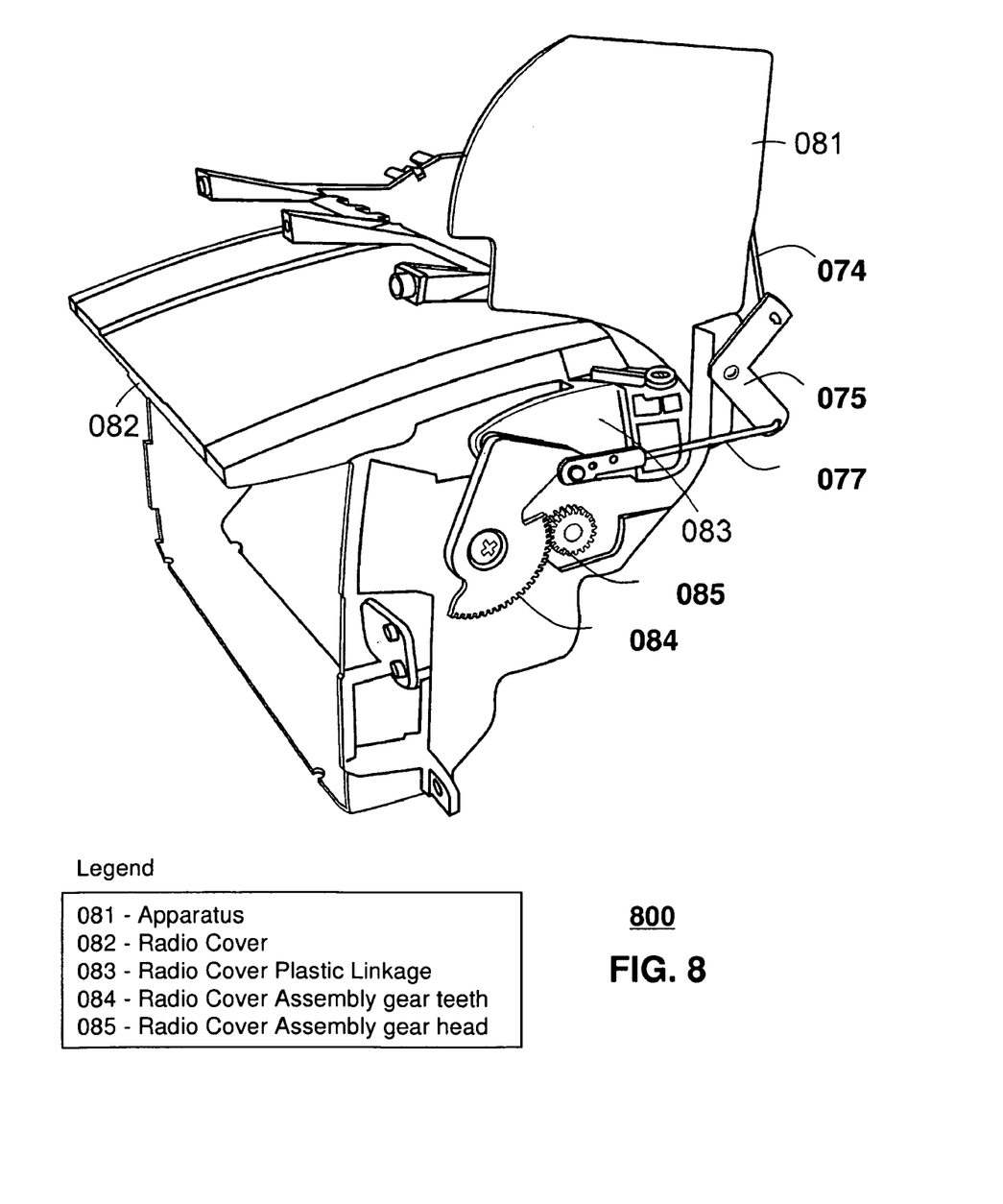
FIG. 8 is an illustration of the preferred embodiment of the invention installed onto the Scion® tC radio cover assembly, with the cover in an opened position.

FIG. 8 is an illustration of the apparatus (see "apparatus" 600 FIG. 6) installed onto the Scion® tC radio cover assembly, with the cover in an opened position. Briefly, the radio cover 082 is mechanically opened or closed by the Radio Cover Assembly gear head 085 when the Radio Cover Assembly gear teeth 084 on the radio cover plastic linkage 083 are caused to move by the pulling action of the linkage system. Elements 084 and 085 exist on the Scion® tC Radio Cover Assembly. A portion of the linkage system ("z-bend" linkage 074, bellcrank 075, threaded linkage rod 077) shows that the apparatus 081 by way of the servo horn linkage 0712 (not shown since it is blocked in view of 081, see FIG. 7) is in a position such that the radio cover 082 is opened.

Figure 9:
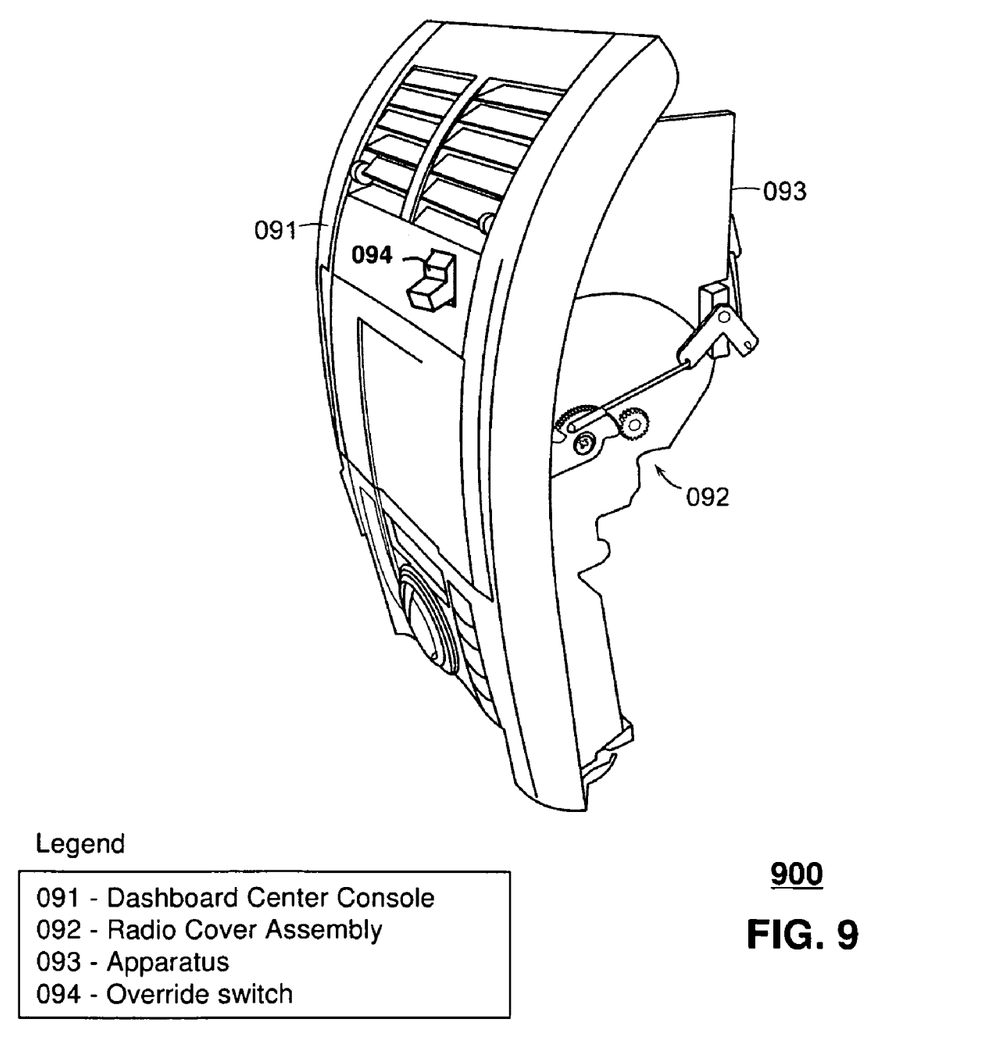
FIG. 9 is an illustration of the preferred embodiment of the invention installed onto the Scion® tC radio cover assembly, which is attached to the dashboard center console.

FIG. 9 is an illustration of the apparatus assembly installed with the Scion® tC dashboard center console. The illustration shows the dashboard center console 091 removed from the Scion® tC automobile of FIG. 1 to permit side viewing. It can be seen that the apparatus assembly fits within the dashboard center console. The radio cover assembly 092 is shown attached to the center console 091. The apparatus 093 is attached to the radio cover assembly 092.

The apparatus assembly 900 shown in FIG. 9 can further include an override switch 094 to override the ignition switch (see FIG. 3) and direct the Servo Motor to open or close the radio cover irrespective of the state of the ignition switch. The override switch 094 includes at least a first state that directs the microcontroller to ignore an ignition accessory signal and open the cover, a second state that directs the microcontroller to ignore the ignition accessory signal and close the cover, and a third state that directs the microcontroller to open the cover when the ignition accessory signal indicates that the ignition switch is in an "on" position, and close the cover when the ignition accessory signal indicates that the ignition switch is in an "off" position.

Figure 10:
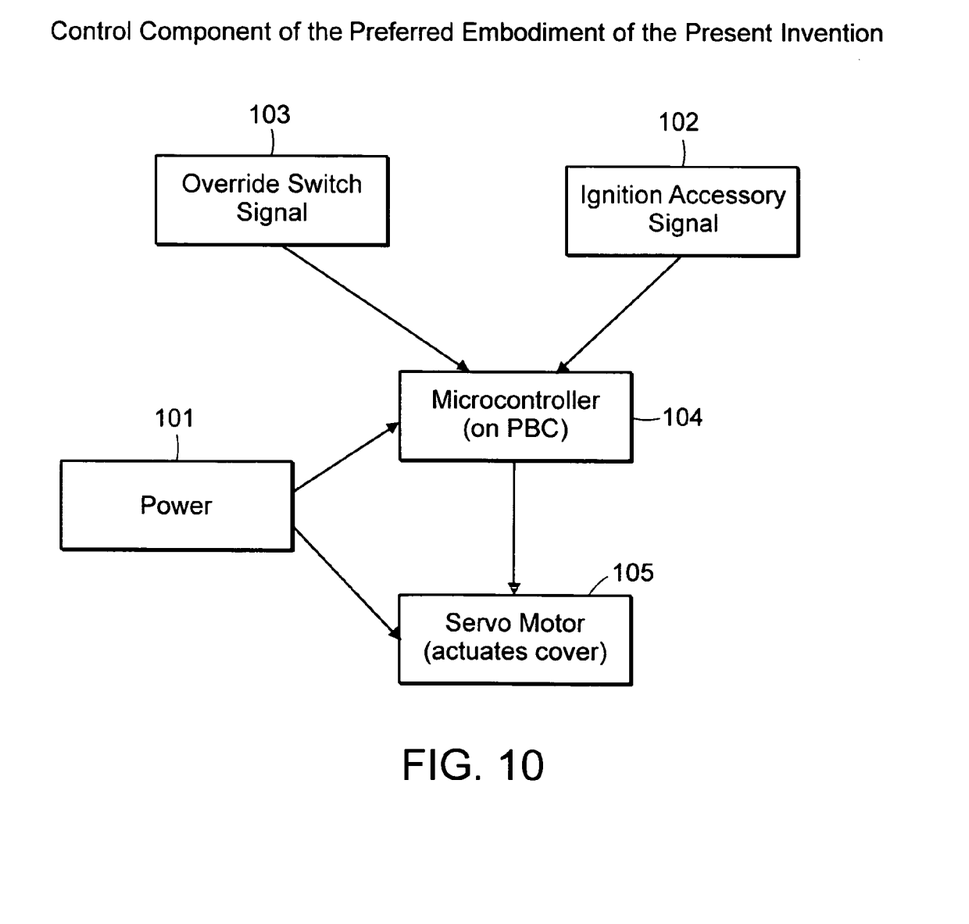
FIG. 10 is a block diagram representing the control components of the apparatus.

FIG. 10 is a block diagram representing the control components of the apparatus. A power input 101 is received from the Scion® tC's electrical system and provides power needed to actuate the servo motor 062 (see FIG. 6) and hence the radio cover 052 (see FIG. 5). The ignition accessory signal 102 is generated by the Scion® tC electrical system and is input into the apparatus. The override switch signal 103 is generated by an auxiliary switch and is input into the apparatus. The microcontroller 104 is physically located on the PCB 061. It receives input signals 102 and 103 and generates a control signal for the servo motor 104. The servo motor control component 105 received a control signal from the microcontroller 105.

By way of the ignition accessory signal 102 the microcontroller 104 determines when the ignition key is turned to the "on" position so as to "open" the radio cover. It also determines when the ignition key is in the "off" position so as to "close" the radio cover. This permits the apparatus to automatically open or close the radio cover in response to the position of the ignition key without the user having to manually touch the radio cover. Furthermore, by way of the manually operated override switch signal, the microcontroller 104 can ignore the position of the ignition switch if the user decides to manually operate the radio cover and move the radio cover to an opened or closed position. That is, the microcontroller 104 can disable automated opening or closing of the radio cover responsive to detecting the override switch signal.

Figure 11:
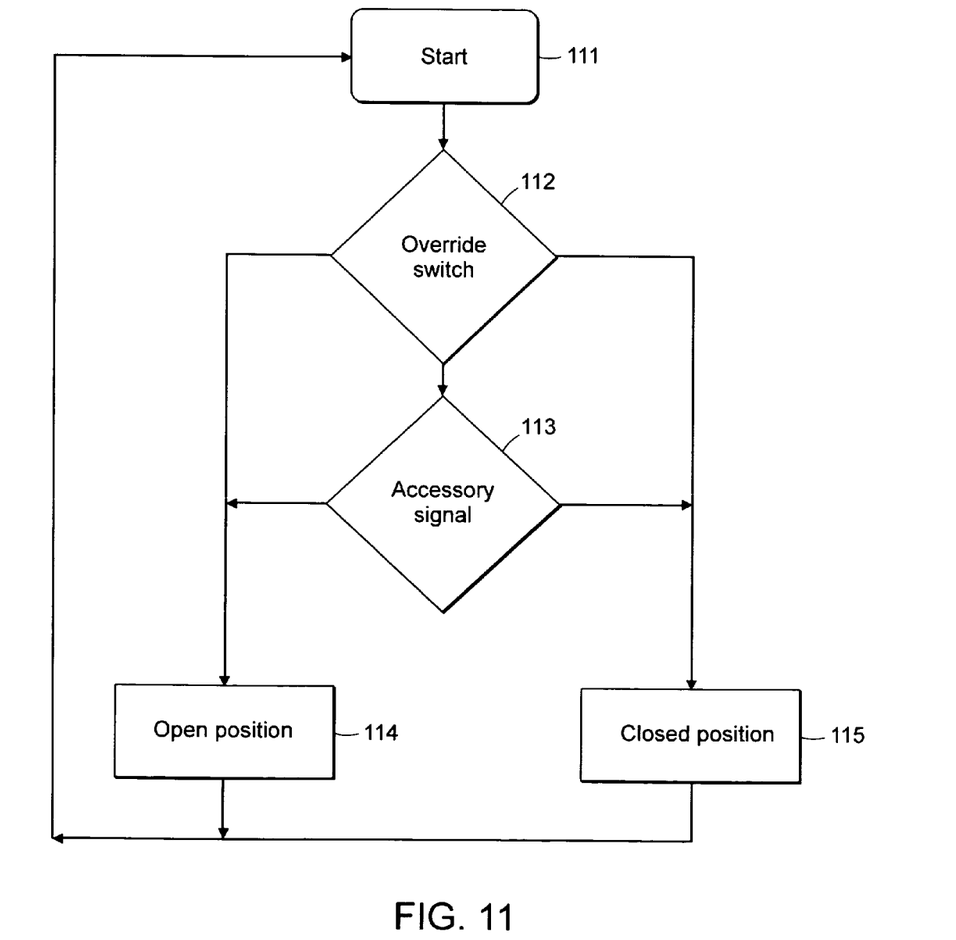
FIG. 11 is a flow chart illustrating an exemplary functionality of the control logic of the microcontroller for automated opening and closing of the radio cover Unless otherwise indicated, illustrations in the figures are not necessarily drawn to scale.

FIG. 11 is a flow chart illustrating exemplary functionality of the control logic as performed by the microcontroller for automated opening and closing of the radio cover. The microcontroller 104 (see FIG. 10) executes software that performs the functions shown in FIG. 11. The microcontroller 066 first checks the state of an override switch as indicated by the decision diamond for the override switch signal 112. If the override switch signal 112 indicates that the switch is at the "center" position, the microcontroller 066 then proceeds to check the ignition accessory signal 113. If the override switch signal 112 indicates that the override switch is in the "up" position, the microcontroller ignores the ignition accessory signal 113 and sends the servo motor 062 a signal indicating that it should open the radio cover 0711 by moving the servo horn linkage 0712 as needed. However, if the override switch signal 112 indicates that the override switch is in the "down" position, the microcontroller ignores the ignition accessory signal 113 and sends the servo motor 062 a signal indicating that it should close the radio cover 0711. When checking the state of the ignition accessory signal 113, the microcontroller 066 sends the servo motor 062 a signal to close the radio cover 0711 if the ignition accessory signal is below a predetermined voltage level, for example, at 0 Volts, and a signal to open the radio cover, for example, if the ignition accessory signal is at +12 Volts. Note that the state of the ignition accessory signal 113 is determined by the position of an ignition key. The method steps of the flowchart in FIG. 11 is further described with reference to the apparatus shown in FIGS. 6 and 9. As shown, the microcontroller 066 (see FIG. 6) checks if the override switch 094 (see FIG. 9) is in the first state, and if so, ignores the ignition accessory signal, and sends the Servo Motor a signal to open the radio cover by moving the Linkage System. The first state can correspond to the "up" position of the override switch 094. For example, the user may simply want to flip up the override switch to open the radio cover regardless of a state of the ignition switch. Briefly, the ignition accessory signal is provided by the ignition switch (e.g., where the car key is inserted) of the Scion® tC auto mobile as shown in FIG. 3. The microcontroller 066 can monitor this ignition switch to determine if the ignition key (i.e., car key) is in an "off" position (e.g., turn off car engine) or an "on" position (e.g., turn on car engine).

The microcontroller 066 also checks if the override switch 094 is in the second state, and if so, ignores the ignition accessory signal, and sends the servo motor a signal to close the radio cover by moving the Linkage System. The second state can correspond to the "down" position of the override switch 094. For example, the user may simply want to flip down the override switch to close the radio cover regardless of a state of the ignition switch.

The microcontroller also checks if the override switch is in the third state, and if so proceeds to check the ignition accessory signal to direct control for opening or closing of the radio cover. The third state can correspond to the "center" position of the override switch 094. For example, instead of the user manually flipping the override switch 094 up or down to respectively open or close the radio cover, the user by positioning the override switch 094 at a center position, delegates automatic opening and closing of the radio cover base on the state of the ignition switch. In this case, when the ignition switch is turned off (e.g., car engine off) the radio cover assembly automatically closes the radio cover, and when the ignition switch is turned on (e.g., car engine on) the radio cover assembly automatically opens the radio cover. In this manner, the user does not need to manually operate the radio cover or the override switch 094.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. An apparatus for automated control of a radio cover assembly present in an automobile, comprising:
   (a) a Printed Circuit Board assembly which is mounted to a radio cover of said radio cover assembly to provide mechanical support and a common point of attachment;
   (b) a Servo Motor mounted to said Printed Circuit Board assembly for providing actuation motion;
   (c) a Linkage System to couple said actuation motion from said Servo Motor to said radio cover; and
   (d) a microcontroller to control said Servo Motor and operatively coupled to an override switch,
   wherein said apparatus contains said Servo Motor, said Linkage System, and said microcontroller, and
   wherein said microcontroller
   operates said Servo Motor to move said radio cover from an opened to a closed position and visa-versa in an automated manner by way of said Linkage System,
   ignores an ignition switch and opens said radio cover if said override switch is in a first position,
   ignores said ignition switch and closes said radio cover if said override switch is in a second position, and
   opens said radio cover upon detecting said ignition switch turned to an ON position, if said override switch is in a third position,
   closes said radio cover upon detecting said ignition switch turned to an OFF position if said override switch is in said third position, and
   determines when a user physically opens or closes said radio cover of said radio cover assembly, and if so,
   overrides control of said apparatus to permit said user to open and close said radio cover.

2. An apparatus for automated control of a radio cover assembly present in an automobile, comprising:
   a Printed Circuit Board Assembly;
   a Servo Motor mountable to said Printed Circuit Board Assembly to actuate a Servo Horn Linkage;
   said Servo Horn Linkage attachable to said Servo Motor to provide a point of attachment to a Linkage System;
   said Linkage System attachable to said Servo Horn Linkage to provide a point of attachment to a radio cover of said radio cover assembly; and
   a microcontroller operatively coupled to said Servo Motor to control operation of said Servo Horn Linkage to actuate a mechanical opening and closing of a radio cover of said radio cover assembly; and
   an override switch operatively coupled to said microcontroller to monitor an ignition switch and to direct said Servo Motor to open or close said radio cover irrespective of a state of said ignition switch, wherein said override switch comprises:
   a first state that directs said microcontroller to ignore said ignition switch and open said radio cover,
   a second state that directs said microcontroller to ignore said ignition switch and close said radio cover, and
   a third state that directs said microcontroller to open said radio cover when said ignition switch is in an ON position, and close said radio cover when said ignition switch is in an OFF position,
   wherein said microcontroller
   checks if said override switch is in said first state, and if so, ignores an ignition accessory signal, and
   sends said Servo Motor a signal to open said radio cover by moving said Linkage System.

3. The apparatus of claim 2, where said Linkage System comprises:
   a Double "Z-Bend" Linkage Rod to transfer movement from said Servo Horn Linkage to a Bellcrank;
   said Bellcrank operatively coupled to transfer motion from said Double "Z-bend" Linkage Rod to a Threaded Link Rod;
   said Threaded Link Rod operatively coupled to transfer motion from said Bellcrank to a Ballend; and
   said Ballend operatively coupled to said Threaded Link Rod to transfer motion to said radio cover assembly.

4. The apparatus of claim 2, wherein said microcontroller detects an ignition accessory signal to determine when said ignition switch is turned to an "ON" or "OFF" position for:
   commanding said Servo Motor to open said radio cover when an ignition key is turned to an "ON" position, or
   commanding said Servo Motor to close said radio cover when said ignition key is turned to an "OFF" position.

5. The apparatus of claim 2, wherein said microcontroller sends said Servo Motor another signal to open said radio cover if said ignition accessory signal is at approximately +12 Volts.

6. The apparatus of claim 2, wherein said microcontroller checks if said override switch is in said second state, and if so, ignores said ignition accessory signal, and sends said Server Motor a signal to close said radio cover by moving said Linkage System accordingly.

7. The apparatus of claim 6, wherein said microcontroller sends said Servo Motor a signal to close said radio cover if said ignition accessory signal is at approximately 0 Volts.

8. The apparatus of claim 2, wherein said microcontroller checks if said override switch is in said third state, and if so proceeds to check said ignition accessory signal to direct control for opening or closing of said radio cover.

9. The apparatus of claim 2, wherein
   said first state corresponds to an "UP" position; said second state corresponds to a "DOWN" position; and said third state corresponds to a "CENTER" position.

10. An apparatus for automated control of a radio cover assembly present in an automobile, comprising:
    a Printed Circuit Board Assembly;
    a Servo Motor mountable to said Printed Circuit Board Assembly to actuate a Servo Horn Linkage;
    said Servo Horn Linkage attachable to said Servo Motor to provide a point of attachment to a Linkage System;
    said Linkage System attachable to said Servo Horn Linkage to provide a point of attachment to a radio cover of said radio cover assembly; and a microcontroller operatively coupled to said Servo Motor to control operation of said Servo Horn Linkage to actuate a mechanical opening and closing of said radio cover of said radio cover assembly, wherein said microcontroller monitors both an ignition switch and an override switch and directs said Servo Motor to ignore said ignition switch and opens said radio cover if said override switch is in a first position, ignores said ignition switch and close said radio cover if said override switch is in a second position; and opens said radio cover upon detecting said ignition switch in an ON position and close said radio cover upon detecting said ignition switch in an OFF position if said override switch is in a third position.

11. The apparatus of claim 10, wherein said first position is an UP position, the second position is a DOWN position, and the third position is a CENTER position.

* * * * *